(12) United States Patent
Maesen et al.

(10) Patent No.: US 8,603,932 B2
(45) Date of Patent: Dec. 10, 2013

(54) HYDROCRACKING CATALYST AND PROCESS USING A MAGNESIUM ALUMINOSILICATE CLAY

(75) Inventors: Theodorus Maesen, Point Richmond, CA (US); Alexander E. Kuperman, Orinda, CA (US); Darren P. Fong, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/344,040

(22) Filed: Jan. 5, 2012

(65) Prior Publication Data

US 2012/0122661 A1   May 17, 2012

Related U.S. Application Data

(62) Division of application No. 12/245,548, filed on Oct. 3, 2008, now Pat. No. 8,518,239.

(51) Int. Cl.
  *B01J 21/16* (2006.01)
(52) U.S. Cl.
  USPC ............ 502/80; 502/64; 502/66; 502/63; 502/68
(58) Field of Classification Search
  None
  See application file for complete search history.

(56) References Cited

U.S. PATENT DOCUMENTS 5,023,221 A * 6/1991 Occelli .................. 502/66
6,667,267 B1 * 12/2003 Benazzi et al. ............ 502/66

* cited by examiner

*Primary Examiner* — Melvin C Mayes
*Assistant Examiner* — Colette Nguyen
(74) *Attorney, Agent, or Firm* — Chloe Zubieta

(57) ABSTRACT

This invention is directed to hydrocracking catalysts and hydrocracking processes employing a magnesium aluminosilicate clay. The magnesium aluminosilicate clay has a characteristic $^{29}$Si NMR spectrum. The magnesium aluminosilicate clay is the product of a series of specific reaction steps. Briefly, the magnesium aluminosilicate clay employed in the catalyst and process of the present invention is made by combining a silicon component, an aluminum component, and a magnesium component, under aqueous conditions and at an acidic pH, to form a first reaction mixture and subsequently the pH of the first reaction mixture is adjusted to greater than about 7.5 to form a second reaction mixture. The second reaction mixture is allowed to react under conditions sufficient to form the magnesium aluminosilicate clay. The resulting magnesium aluminosilicate clay combines high surface area and activity for use in hydrocracking catalysts and processes.

11 Claims, No Drawings

HYDROCRACKING CATALYST AND PROCESS USING A MAGNESIUM ALUMINOSILICATE CLAY

This application is a Divisional application of Ser. No. 12/245,548 filed Oct. 3, 2008, now U.S. Pat. No. 8,518,239.

This application is related to two co-filed patent applications titled "Hydrodemetallization catalyst and process" and "Magnesium aluminosilicate clays-synthesis and catalysis," herein incorporated in their entirety.

FIELD OF THE INVENTION

This invention is directed to hydrocracking catalysts and hydrocracking processes employing a magnesium aluminosilicate clay.

BACKGROUND OF THE INVENTION

Hydrocracking catalysts can comprise various components. Generally, hydrocracking catalysts comprise at least one acidic component that helps convert high molecule weight hydrocarbons to lower molecular weight hydrocarbons. One type of acidic component used in hydrocracking catalysts is an acidic clay such as a magnesium aluminosilicate clay. Magnesium aluminosilicate clays can be described as a type of layered material comprising alternating sheets of octahedrally co-ordinated magnesium atoms and tetrahedrally co-ordinated silicon and/or aluminum atoms. Magnesium aluminosilicate clays have a negative layer charge which can be balanced by cations. Among other characteristics, the type of charge balancing cations imparts catalytic activity to the magnesium aluminosilicate clays. The literature contains examples of magnesium aluminosilicate clays used as hydrocracking catalysts or as components of hydrocracking catalysts.

While synthesis of clays can be difficult, particularly on a large scale, clays have received attention for use in catalytic processes such as (hydro)cracking. For example, U.S. Pat. No. 3,844,978 discloses a layer-type, dioctahedral, clay-like mineral useful in catalytic cracking processes. The clay-like mineral is a magnesium aluminosilicate that can be used as a catalyst or as a component in a catalyst composition.

U.S. Pat. No. 3,844,979 discloses a layer-type trioctahedral, clay-like mineral that is a magnesium aluminosilicate, a catalyst composition comprising said magnesium aluminosilicate, and hydroprocesses using said magnesium aluminosilicate.

U.S. Pat. No. 3,887,454 discloses hydroconversion processes using a layer-type, dioctahedral, clay-like mineral that is a magnesium aluminosilicate. Catalyst compositions and hydroprocessing reactions using catalyst compositions comprising magnesium aluminosilicates and hydrogenation components such as Group VIII metals are also disclosed.

U.S. Pat. No. 6,187,710 and U.S. Pat. No. 6,565,643 disclose synthetic swelling clay minerals, methods of making swelling clay minerals, and the use of said swelling clay minerals as hydrocarbon reaction catalysts. U.S. Pat. No. 6,334,947 discloses catalysts compositions comprising a swelling clay and the use of said catalyst compositions in hydroprocessing reactions. Magnesium aluminosilicates are examples of swelling clays disclosed in U.S. Pat. No. 6,187,710, U.S. Pat. No. 6,565,643, and U.S. Pat. No. 6,334,947.

There exists a need for magnesium aluminosilicate clays with improved characteristics that can be used as catalysts or components of catalyst compositions in hydrocracking.

SUMMARY OF THE INVENTION

This application discloses hydrocracking catalysts comprising a magnesium aluminosilicate clay wherein the magnesium aluminosilicate clay is synthesized according to a process comprising the following steps:

a) combining (1) a silicon component, (2) an aluminum component, and (3) a magnesium component, under aqueous conditions at a first reaction temperature and at ambient pressure, to form a first reaction mixture, wherein the pH of said first reaction mixture is acidic;

b) adding an alkali base to the first reaction mixture to form a second reaction mixture wherein the pH of the second reaction mixture is greater than the pH of the first reaction mixture;

c) reacting the second reaction mixture at a second reaction temperature and for a time sufficient to form a product comprising a magnesium aluminosilicate clay.

Also included within the present invention are hydrocracking catalysts, comprising the magnesium aluminosilicate clay as set forth above, wherein said hydrocracking catalysts further comprise one or more catalytically active metals, zeolites, inorganic oxides, or combinations thereof. Particularly useful catalytically active metals are Group VIB and/or Group VIII metals, particularly platinum, palladium, cobalt, nickel, molybdenum, and tungsten.

This application also discloses hydrocracking catalyst compositions comprising a magnesium aluminosilicate clay wherein said magnesium aluminosilicate clay has a silicon to aluminum elemental mole ratio greater than 3 and wherein the $^{29}$Si NMR of the magnesium aluminosilicate clay comprises peaks as given in Table 1:

TABLE 1

| Peaks | Chemical shift (ppm)[1] |
|---|---|
| P1 | −79 |
| P2 | −82 |
| P3 | −85 |
| P4 | −88 |
| P5 | −93 |

[1] +/− 3 ppm

In an embodiment, the magnesium aluminosilicate clay is mesoporous.

Hydrocracking processes employing the catalysts described above also form part of this invention.

Other objects and advantages will become apparent from the detailed description and the appended claims.

DETAILED DESCRIPTION OF THE INVENTION

The catalysts of the invention comprise a magnesium aluminosilicate clay. The magnesium aluminosilicate clay is prepared by the following steps:

a) combining (1) a silicon component (2) an aluminum component, and (3) a magnesium component, under aqueous conditions at a first reaction temperature and at ambient pressure, to form a first reaction mixture, wherein the pH of said first reaction mixture is acidic;

b) adding an alkali base to form a second reaction mixture wherein the pH of the second reaction mixture is greater than the pH of the first reaction mixture;

c) reacting the second reaction mixture at a second reaction temperature and for a time sufficient to form the magnesium aluminosilicate clay.

The magnesium aluminosilicate clay can then be converted to a protonated form by exchanging the alkali cations in an ion exchange reaction. Generally, the alkali cations are exchanged for ammonium cations. The resulting ammonium substituted magnesium aluminosilicate clay is then deammoniated by calcination resulting in the protonated form of the magnesium aluminosilicate clay. Calcination of the magnesium aluminosilicate clay can occur prior to, during, or after formation of the hydrocracking catalyst. The magnesium aluminosilicate clay synthesized by the above described process can be composited with a number of other components to form the catalyst of the invention. Examples of other components include, but are not limited to, zeolites, inorganic oxides, active metals, molecular sieves, and other clays. Catalysts prepared as outlined above can be used for a wide variety of hydroprocessing reactions. The catalysts are of particular use in hydrocracking processes. The invention is further directed to hydrocracking processes employing the catalysts.

Definitions

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The following terms will be used throughout the specification and will have the following meanings unless otherwise indicated.

As used herein "hydrothermal" refers to reactions performed in the presence of water or steam at temperatures above 100° C. and at pressures above atmospheric pressures (i.e. above about 1.2 bar).

As used herein "hydrocarbon" refers to any compound which comprises hydrogen and carbon, and "hydrocarbon feedstock" refers to any charge stock which contains greater than about 90 weight percent carbon and hydrogen.

As used herein "Group VIB" or "Group VIB metal" refers to one or more metals, or compounds thereof, selected from Group VIB of the CAS Periodic Table.

As used herein "Group VIII" or "Group VIII metal" refers to one or more metals, or compounds thereof, selected from Group VIII of the CAS Periodic Table.

As used herein "cracking" refers to the breaking of larger carbon containing molecules into smaller ones. Cracking can refer to hydrocracking wherein the cracking takes place in the presence of an elevated partial pressure of hydrogen gas. Cracking also refers to catalytic cracking wherein the cracking takes place in the presence of acid catalysts.

As used herein "aqueous mixture" refers to a combination of one or more components in the presence of water. The components can be soluble, somewhat soluble, or insoluble. The aqueous mixture can be homogeneous or heterogeneous.

The term "mesoporous" refers to an average pore size of about 2 to 50 nm.

The term "ambient pressure" refers to pressures in the range of about 0.9 bar to about 1.2 bar.

The BET surface area is determined by adsorption of nitrogen at 77K and mesopore surface area by the BJH method (described in E. P. Barrett, L. C. Joyner and P. H. Halenda, J. Amer. Chem. Soc., 73, 1951, 373.). The micropore volume is determined by the DR equation (as described in Dubinin, M. M. Zaverina, E. D. and Raduskevich, L. V. Zh. Fiz. Khimii, 1351-1362, 1947). The total pore volume is determined from the nitrogen adsorption data, the mesopore volume is determined by the difference between total pore volume and the micropore volume.

$^{29}$Si NMR spectra can be collected at a spinning speed of 8 kHz with at least 500 scans and a relaxation time of 100 seconds between scans.

The synthesis process for making the magnesium aluminosilicate clay employed in the invention comprises forming an aqueous mixture of a silicon component, an aluminum component, and a magnesium component under acidic conditions to form a first reaction mixture. As used herein "component" refers to any material, salt, and/or compound comprising a given element which can act as a source of said element. For example "silicon component" can refer to silicon in the elemental form, silicon containing compounds, and/or silicon salts which can be used as a source of silicon. Examples of silicon components include, but are not limited to, sodium silicate, potassium silicate, silica gels, silica sols, and combinations thereof. In one embodiment, the silicon component is sodium silicate. Examples of aluminum components include, but are not limited to, sodium aluminate, potassium aluminate, aluminum sulfate, aluminum nitrate, and combinations thereof. In one embodiment of the invention, the aluminum source is aluminum nitrate. Examples of magnesium components include, but are not limited to, magnesium metal, magnesium hydroxide, magnesium halides, magnesium sulfate, and magnesium nitrate. In one embodiment of the invention the magnesium component is magnesium nitrate.

In the first reaction mixture, the ratio of silicon to aluminum to magnesium, can be expressed in terms of elemental mole ratios as:

$$a\text{Si}:b\text{Al}:c\text{Mg}$$

wherein "a" has a value from 6 to 8, "b" has a value from 0.001 to 7.9, and "c" has a value of from 0.1 to 6, wherein b=(6−c)+(8−a), and wherein a:b is at least 3.

The silicon, aluminum, and magnesium components are combined, under aqueous conditions, to form a first reaction mixture under acidic conditions wherein the first reaction mixture has a pH of between about 0 to about 5. The pH of the first reaction mixture can be adjusted by the addition of an acid in order to achieve a pH of between about 0 to about 5. Examples of acids include, but are not limited to, mineral acids such as sulfuric acid, hydrochloric acid, and nitric acid. Organic acids such as acetic acid, citric acid, formic acid, and oxalic acid can also be used.

The first reaction mixture is generally formed under ambient pressure and temperature conditions. Pressures ranges for the reaction are between about 0.9 bar and 1.2 bar, preferably between about 1.0 bar and about 1.1 bar. The temperature for the formation of the first reaction mixture is not critical. Generally, the temperature is between about 0° C. and 100° C. and preferably at least 50° C.

After addition of the silicon, aluminum, and magnesium components and adjustment of the pH to between about 0 to about 5 to form the first reaction mixture, an alkali base is added to form a second reaction mixture. Examples of alkali base include, but are not limited to, sodium hydroxide and potassium hydroxide. Sufficient alkali base is added to the first reaction mixture so as to ensure that the pH of the resulting second reaction mixture is at least 7.5.

The second reaction mixture is then reacted for sufficient time and at sufficient temperature to form the magnesium aluminosilicate clay used in the catalysts and processes of the invention. In embodiments, the time is at least one second, preferably at least 15 minutes, and most preferably at least 30 minutes. In some embodiments, precipitation of the magnesium aluminosilicate clay can be instantaneous. The temperature of the second reaction mixture can range from about 0° C. to about 100° C. In an embodiment, the temperature of the second reaction mixture is at least 50° C. Generally, higher temperatures result is shorter times to form the magnesium aluminosilicate clay. The second reaction mixture step can be done at ambient pressure, although higher or lower pressures are not excluded. In the synthesis process described, the magnesium aluminosilicate clay is formed in the second reaction mixture step. In some embodiments, the magnesium aluminosilicate clay quantitatively precipitates from the second reaction mixture. The second reaction mixture, upon precipitation of the magnesium aluminosilicate clay comprises the solid magnesium aluminosilicate clay and a supernatant. By "supernatant" it is meant the aqueous portion of the reaction mixture that is in liquid form, essentially free of solid or particulate material. The magnesium aluminosilicate clay can be collected by, for example, filtration, evaporation of the supernatant, or centrifugation. The addition of an alkali base during the second step of the synthesis process will incorporate alkali cations into the magnesium aluminosilicate clay.

The magnesium aluminosilicate clay can then be washed, and/or dried, and/or ion exchanged, and/or calcined. In embodiments, the magnesium aluminosilicate clay is subjected to an ion exchange reaction with an ammonium salt solution, wherein at least a portion of the alkali in the product is exchanged for ammonium cations. The magnesium aluminosilicate clay need not be isolated from the second reaction mixture before ion exchange. For example, an ammonium salt in solid or solution form can be directly added to the second reaction mixture after the precipitation of the magnesium aluminosilicate clay. Examples of ammonium salts include, but are not limited to, ammonium nitrate, ammonium bicarbonate, and ammonium chloride. Generally, the ammonium cations will have the formula $[NH_xR_y]^+$, where R is any alkyl or other organic radical group, $x=1-4$, $y=0-4$, and $x+y=4$. In a preferred embodiment, the ammonium cations are $NH_4^+$ cations. After ion exchange the magnesium aluminosilicate product can then be separated from the supernatant by filtration, centrifugation, or any other methods known in the art. The product can then be dried and/or calcined.

The supernatant from the ion exchange step can be collected for use in other applications. For example, if nitric acid was used during synthesis and the ion exchange reaction used ammonium cations, the effluent will be rich in ammonium nitrate. After isolation of the magnesium aluminosilicate clay, the ammonium nitrate rich supernatant can be used as a fertilizer or as a component in a fertilizer. Because the precipitation of the magnesium aluminosilicate product can be essentially quantitative, the supernatant can have essentially no magnesium, silicon, or aluminum present. The presence of excess amounts of silicon and/or aluminum and/or magnesium would render the supernatant less useful as a fertilizer or fertilizer component. By using the supernatant as well as the magnesium aluminosilicate clay product, an economic benefit can be realized in that there is little waste of reagents or costly recycling of magnesium, silicon, and/or aluminum containing supernatent.

Before use as a catalyst or as a component in a catalyst, the magnesium aluminosilicate clay can be calcined. The magnesium aluminosilicate clay can be combined with other components before or after calcination. Calcination is generally performed at temperatures between about 450° C. to about 900° C. for a time ranging from about 1 hour to about 12 hours under an inert atmosphere. Calcination reaction times and temperatures are not critical. For example, if the magnesium aluminosilicate clay comprises ammonium cations, the calcination is generally performed at sufficient temperature and for sufficient time so as to deammoniate or remove other nitrogen containing compounds from the product, leaving protons as the charge compensating ions in the product. By deammoniate it is meant that ammonia is driven off, leaving protons as the charge compensating ions in the product. The calcination step is necessary to form a catalytically active material.

The product of the above described process is a magnesium aluminosilicate clay. The ratio of silicon to aluminum in the magnesium aluminosilicate clay is at least 3. The ratio of silicon to aluminum to magnesium of the magnesium aluminosilicate clay can be expressed in terms of elemental mole ratios:

$$d\text{Si}:e\text{Al}:f\text{Mg}$$

wherein "d" has a value from 6 to 8, "e" has a value from 0.001 to 7.9, and "f" has a value of from 0.1 to 6, wherein $e=(6-f)+(8-d)$, and wherein d:e is at least 3.

The magnesium aluminosilicate clay employed in the catalyst and process of the invention is a layered material composed of elemental clay platelets. The size of the clay platelets of the magnesium aluminosilicate clay is dependent on the reacting temperature and the reacting time of the second reaction mixture. Generally, the higher the temperature and the longer the time, the larger the clay platelets will be. Depending of the desired size of the clay platelets in the product, reacting time and temperature can be varied accordingly. In one embodiment the magnesium aluminosilicate comprises clay platelets with an average size of from about 5 nm to about 500 nm. In another embodiment the product comprises clay platelets with an average size of from about 5 nm to about 50 nm.

The degree of stacking of the clay platelets is dependent on the ionic strength of the second reaction mixture. A high ionic strength will give much-stacked structures, while a low ionic strength will lead to structures exhibiting little stacking. The ionic strength of the second reaction mixture can be adjusted by increasing or decreasing the concentration of reactants (silicon, aluminum, and magnesium components) and altering the pH. For example, a dilute solution with a pH about 8 will have a lower ionic strength than a solution with a high concentration of reactants and a pH higher than 8. In one embodiment, the clay platelets have a degree of stacking of between 1 to about 5, in another embodiment the clay platelets have a degree of stacking of between about 1 to about 3. The lower limit is constituted by unstacked clay platelets, which have a "degree of stacking" of 1. The two parameters-the size of the clay platelets and the degree of stacking—can be estimated by means of transmission electron microscopy (TEM) and powder x-ray diffraction respectively. In an embodiment, the powder x-ray diffraction of the magnesium aluminosilicate clay of the invention has only broad peaks. Broad peaks are indicative of a low degree of stacking.

The individual clay platelets are composed of sheets of octahedrally coordinated metal ions interlinked by means of oxygen ions and sheets of tetrahedrally coordinated metal ions interlinked by oxygen ions. The apical oxygen atoms of the tetrahedral sheets help form the base of the octahedral sheets, thus connecting the sheets to one another. A regular assemblage of sheets (for example tetrahedral-octahedral or tetrahedral-octahedral-tetrahedral) is called a layer. If the sheet arrangement is tetrahedral-octahedral it is referred to as 1:1, if the sheet arrangement is tetrahedral-octahedral-tetrahedral it is referred to as 2:1. The product of the present invention can be described as a 2:1 layered magnesium aluminosilicate.

The catalytic activity of the magnesium aluminosilicate clay stems in part from the charge on the sheets. A neutral tetrahedral sheet requires that the tetrahedrally co-ordinated metal ion have a tetravalent charge. In general, the metal ion will be $Si^{4+}$. To have a neutral octahedral layer, the metal ions present in that layer will have to provide a total charge of 6+ for every three octahedral cavities. This can be achieved by filling two out of every three octahedral cavities with trivalent metal ions, such as $Al^{3+}$, or by filling all octahedral cavities of each set of three with divalent metal ions, such as $Mg^{2+}$. This gives two types of octahedral layers, trioctahedral layers, in which all octahedral sites are filled and dioctahedral layers, which have two thirds of the octahedral sites filled. We believe that the product of the present invention comprises a 2:1 trioctahedral magnesium aluminosilicate. For further description of clay classification see J. Theo Kloprogge, Sridhar Komarneni, and James E. Amonette, "Synthesis of smectite clay minerals; a critical review" *Clays and Clay Minerals*; October 1999; v. 47; no. 5; p. 529-554, herein incorporated by reference.

When lower valency cations are substituted or partially substituted for higher valency cations in the clay platelet structure, the clay platelet is negatively charged. For instance, in the tetrahedral layer trivalent metal ions, for example $Al^{+3}$, may be substituted for a portion of the tetravalent metal ions such as $Si^{+4}$. In the case of a clay with a trioctahedral layer structure, such as the product of the process of the present invention, such a substitution will give a saponite or a vermiculite. The divalent $Mg^{2+}$ metal ions in the octahedral layer can be substituted or partially substituted by monovalent metal ions such as $Na^+$, $K^+$, or $Li^+$.

In an embodiment of the magnesium aluminosilicate clay described above, at least 0.1 atomic %, as compared with the neutral clay mineral of the cations, can be replaced by cations of a lower valency. Preferably, at least 1 atomic %, more preferably at least 5 atomic %, of the cations in the clay platelets is replaced by cations of a lower valency. In the octahedral layer, preferably not more than 50 atomic % of the metal ions is replaced by ions of a lower valency as compared with the neutral situation, more preferably not more than 30 atomic % is replaced. In the case of the tetrahedral layer, preferably not more than 30 atomic % of the tetravalent metal ions present is replaced by metal ions of a lower valency, more preferably not more than 15 atomic %. Isomorphous substitution may occur only in the octahedral layer, only in the tetrahedral layer, or in both layers. In this context the term isomorphous substitution also refers to the removal of cations without the incorporation into the lattice of replacement cations, by which vacancies are produced. It will be clear that this removal also generates negative charges.

The neutral tetrahedral layer comprises $Si^{4+}$ ions. At least a portion of the $Si^{4+}$ ions can be substituted by trivalent ions to impart a negative charge on the layer. The trivalent ions in the tetrahedral layer preferably are aluminium ($Al^{3+}$) ions, although other trivalent ions such as chromium, cobalt (III), iron (III), manganese (III), titanium (III), gallium, vanadium, molybdenum, tungsten, indium, rhodium, and/or scandium can also be substituted. In an aspect of the invention, the magnesium aluminosilicate clay comprises at least 1 ppm $Al^{3+}$ ions. The neutral octahedral layer comprises divalent magnesium ($Mg^{2+}$) ions, although other divalent ions such as nickel, cobalt (II), iron (II), manganese (II), copper (II) and/or beryllium can also be incorporated into the neutral octahedral layer. The divalent ions of the neutral octahedral layer can be substituted by monovalent ions such as lithium ($Li^+$) ions to impart a negative charge on the octahedral layer.

The negative charge generated by isomorphous substitution is counterbalanced by the incorporation of cations, also known as counter-ions, into the space between the clay platelets. These counter-ions often are sodium or potassium. Generally, these cations are incorporated in the hydrated form, causing the clay to swell. For this reason, clays with negatively charged clay platelets are also known as swelling clays. It is because of the negative charge caused by isomorphous substitution that clays can be advantageous for use in catalysis, since it gives them the potential to function as solid acids. However, to be able to function as solid acids, it is essential that the clay minerals comprise protons, since these are at least partially responsible for the cracking ability of these compounds. Protons can be incorporated into the clay by replacing the non-hydrolyzable counter-ions such as sodium or potassium with ammonium ions and then heating the whole. This process will deammoniate the material, leaving a proton. Protons can also be introduced by replacing the counter-ions with hydrolyzable metal ions such as Mn(II) and Ca(II).

Generally, a hydrolysable metal ion ($M^{n+}$) may hydrolyze according to the following scheme, depending upon pH and concentration:

$$M^{n+} + xOH^- \leftrightarrow M(OH)_x^{(n-x)+}, \qquad (1)$$

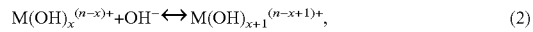

$$M(OH)_x^{(n-x)+} + OH^- \leftrightarrow M(OH)_{x+1}^{(n-x+1)+}, \qquad (2)$$

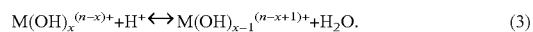

$$M(OH)_x^{(n-x)+} + H^+ \leftrightarrow M(OH)_{x-1}^{(n-x+1)+} + H_2O. \qquad (3)$$

With equation (3) yielding a proton.

While not being bound by any theory, we believe that the magnesium aluminosilicate clays prepared by the synthesis process described above exhibit greater substitution of $Al^{3+}$ in the tetrahedral layer than magnesium aluminosilicate clays prepared by initial formation of a silica-alumina gel. The high degree of substitution of $Al^{3+}$ for $Si^{4+}$ results in a more active magnesium aluminosilicate clay after ion exchange and calcination due to higher acidity of the magnesium aluminosilicate clay.

The magnesium aluminosilicate clay employed in the catalysts and processes of the invention can be characterized by surface area and pore characteristics. The magnesium aluminosilicate clay of the present invention generally has a B.E.T. surface area in the range of 100 to 1000 $m^2/g$ and preferably in the range of 400 to 900 $m^2/g$. The magnesium aluminosilicate clay has an average pore volume, determined by means of B.E.T. nitrogen adsorption, in the range of 0.3 to 2.0 cc/g, preferably in the range of at least 0.5 cc/g, and most preferably in the range of at least 0.9 cc/g. The magnesium aluminosilicate clay has an average pore size, determined by means of nitrogen adsorption/desorption in the mesoporous range. In embodiments, the magnesium aluminosilicate clay of the present invention is mesoporous with an average pore size of about 2 nm to about 50 nm.

In an embodiment, the magnesium aluminosilicate clay has a silicon to aluminum elemental mole ratio greater than 3. The $^{29}Si$ NMR of the magnesium aluminosilicate clay comprises peaks as given in Table 1.

Hydrocracking catalysts of the invention and employed in the process of the invention can be of widely varying composition, provided they contain the magnesium aluminosilicate clay described above. Hydrocracking catalysts of the invention can comprise components in such as metals, zeolites, other clays, molecular sieves, inorganic oxides, binders, diluents, and combinations thereof. The following examples of catalysts are not intended to limit in any way the scope of the invention.

The magnesium aluminosilicate clay employed in the hydrocracking catalyst and process of the invention can act as a support for at least one hydrogenation metal. As used herein "hydrogenation metal" refers to any metal or metal compound capable of lowering the energy of activation for a hydrogenation reaction. As used herein "active metal" and "catalytically active metal" refers to any metal or metal compound capable of lowering the energy of activation for a hydrogenation reaction and is used interchangeably with "hydrogenation metal." Examples of hydrogenation metals include, but are not limited to, nickel, platinum, palladium, ruthenium, tungsten, molybdenum, cobalt, iron, and rhodium. Generally, catalytically active metals are chosen from Group VIB and/or Group VIII of the periodic table. Other metals such as tin, germanium, lead, or compounds thereof, can be added as promotors, particularly when the catalyst also contains nickel or a compound thereof. The promotor can be present in an amount of 0.1 to 30 weight percent, preferably 0.2 to 15 weight percent, based on the catalyst and calculated as metal.

The magnesium aluminosilicate clay employed in the invention can be in an acidic form or in a nonacidic form depending on the desired application for the catalyst. When used in a hydrocracking catalyst, the magnesium aluminosilicate clay employed in the invention is preferably in an acidic form. By "acidic form" it is meant that the magnesium aluminosilicate clay is in a protonated or partially protonated form. This refers to the replacement of at least a portion of the non-acidic cations with protons to balance the negatively charged tetrahedral and/or negatively charged octahedral sheets.

When the magnesium aluminosilicate clay employed in the invention is in an acidic form, the magnesium aluminosilicate can crack the hydrocarbon feedstock, contributing to the overall catalytic activity of the catalyst composition.

In an embodiment, the hydrocracking catalyst of the invention comprises the magnesium aluminosilicate clay described above in combination with one or more zeolites, inorganic oxides, Group VIB metals, and/or Group VIII metals.

Zeolites can be broadly described as crystalline microporous molecular sieves that possess three-dimensional frameworks composed of tetrahedral units ($TO_{4/2}$, T=Si, Al, or other tetrahedrally coordinated atom) linked through oxygen atoms. Zeolite X (FAU) and zeolite Beta are examples of zeolites with large pores delimited by 12-membered rings wherein the pore aperture measures about 7.4 Å. The pores in zeolites are often classified as small (8 T atoms), medium (10 T atoms), large (12 T atoms), or extra-large ($\geq$14 T atoms) according to the number of tetrahedral atoms that surround the pore apertures. The classification of intrazeolite channels as 1-, 2-, or 3-dimensional is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75).

Other examples of large pore zeolites include, but are not limited to, zeolite Y, FAU, EMT, ITQ-21, ERT, and ITQ-33. These are documented at http://topaz.ethz.ch/IZA-SC/StdAtlas.htm, and in Bacrlocher, Meier, and Olson's "Atlas of Zeolite Framework Types", Elsevier, 2001.

In one embodiment, the hydrocracking catalyst of the invention comprises a large pore zeolite which has a Si:Al ratio in the range from about 10:1 to about 100:1, preferably in the range from about 10:1 to about 60:1. In a preferred embodiment the zeolite is a faujasite. The catalyst composition employed in the process of the invention comprises active zeolite components ranging from about 1% to about 50% of the catalyst composition.

Inorganic oxides such as silica, alumina, magnesia, titania, zirconia, and combinations thereof can be components of the catalyst employed in the process of the invention. The inorganic oxide can contribute to the overall catalytic activity of the catalyst composition through contribution of acid sites or the inorganic oxide can act as a diluent or binder. The inorganic oxide can function as filler material, acting as diluent of the cracking activity of the clay platelets, for example, thus making it possible to regulate the cracking activity of the catalyst. The inorganic oxide can provide a matrix for one or more catalytically active components, without providing catalytic activity itself, but improving the attrition resistance of the catalyst composition. The amount of inorganic oxide to be added to the hydroprocessing catalysts of the invention generally depends on the desired activity of the final catalyst composition and can range from 0% to about 95%. The inorganic oxide can provide increased surface area for the catalytically active components of the catalyst composition. In one embodiment, the inorganic oxide can be a mesoporous inorganic oxide with an average pore size from about 2 to 50 nm as measured by nitrogen adsorption/desorption. Preferably the average pore size of the inorganic oxide is between about 7.5 to 12 nm.

The hydrocracking catalyst of the invention can further comprise a hydrogenation component which is selected from a Group VIB metal, a Group VIII metal, and combinations thereof. As will be evident to the skilled person, the word "component" in this context denotes the metallic form of the metal, its oxide form, or its sulphide form, or any intermediate, depending on the situation. The hydrogenation metals are selected from the Periodic Table's Group VIB and Group VIII metals (CAS Periodic Table). The nature of the hydrogenation metal present in the catalyst is dependent on the catalyst's envisaged application. If, for example, the catalyst is to be used for hydrogenating aromatics in hydrocarbon feeds, the hydrogenation metal used preferably will be one or more noble metals of Group VIII, preferably platinum, palladium, or combinations thereof. In this case the Group VIII noble metal preferably is present in an amount of 0.05-5 wt. %, more preferably in an amount of 0.1 to 2 wt. %, and most preferably in an amount of 0.2 to 1 wt. %, calculated as metal. If the catalyst is to be used for removing sulphur and/or nitrogen, it will generally contain a Group VIB metal component and/or a non-noble Group VIII metal component. In an embodiment, the hydrogenation metal is molybdenum, tungsten, nickel, cobalt, or a mixture thereof. The Group VIB and/or non-noble Group VIII hydrogenation metal preferably is present in an amount of 2 to 50 wt. %, more preferably in an amount of 5 to 30 wt. %, most preferably in an amount of 5 to 25 wt. %, calculated as the metal oxide.

The magnesium aluminosilicate clay employed in the invention enables the hydrogenation metals, as described above, to be incorporated, at least in part, into the magnesium aluminosilicate platelet structure. For instance, cobalt or nickel may be present in the octahedral layer. In order to be catalytically active, these metals must be removed from the clay platelet structure during catalyst use. This can be done, for example, by means of reduction or sulphidation, for instance when the catalyst is sulphided under reducing conditions prior to use. Alternatively, the hydrogenation metals can be incorporated into the interlayer between the clay platelets through ion exchange. Regardless of the incorporation site, the magnesium aluminosilicate clay helps to disperse the catalytically active metal.

Various methods of adding active metals to catalyst compositions are known in the art. Briefly, methods of incorporating active metals include ion exchange, homogeneous deposition precipitation, redox chemistry, chemical vapor deposition, and impregnation. Preferably, impregnation is used to incorporate active metals into the catalyst composition. Impregnation involves exposing the catalyst composition to a solution of the metal or metals to be incorporated followed by evaporation of the solvent. In an embodiment, chelating agents are used during metal impregnation. "Chelating agents" or "chelates" can be described as a molecule containing one or more atoms capable of bonding to, or complexing with, a metal ion. The chelating agent acts as a ligand to the Group VIB and/or Group VIII metal ions, often through electron pair donor atoms in the chelating agent. Chelated metal ions tend to be more soluble and chelating agents can improve the dispersion of metal ions throughout the catalyst composition. Chelates can be polydentate, in that they can bond or complex to a metal ion through one or more positions. For example a bidentate ligand forms two bonds with a metal ion, whereas a hexadentate ligand forms six bonds with a metal ion. Examples of chelating agents include, but are not limited to, citrate, ethylene diamine tetraacetic acid (EDTA), ethylene glycol tetraacetic acid (EGTA), nitrilotriacetic acid (NTA), halides, nitrate, sulfate, acetate, salicylate, oxalate, and formate. Other examples of chelates include, but are not limited to, carboxylic acid such as glycolic acid, lactic acid, tartaric acid, malic acid, maleic acid, citric acid, glyceric acid, gluconic acid, methoxy-acetic acid, ethoxy-acetic acid, malonic acid, succinic acid and glyoxylic acid and organic sulfur compounds such as mercapto-acetic acid, 1-mercapto-propionic acid, 2-mercaptopropionic acid, 2,3-dimercaptosuccinic acid, mercaptosuccinic acid, thioacetic acid, thio-diglycolic acid, dithio-diglycolic acid, thiosalicylic acid, mercaptoethanol, β-thiodiglycol and thiourea. Other oxygen containing compounds in addition to carboxylic acids can also be used as chelating agents. Examples include, but are not limited to, ethylene glycol, propylene glycol, diethylene glycol, trimethyleneglycol, triethyleneglycol, ethyleneglycol monobutyl ether, diethylene glycol monomethyl ether, diethylene glycol monomethylether, diethylene glycol monopropyl ether, diethylene glycol monobutyl ether, glycerine, trimethylol ethane, and trimethyl propane. In an embodiment, nickel citrate solutions are used to impregnate the catalyst composition. Other examples of metal ion-chelate complexes which can be used to impregnate a catalyst or catalyst composition with metals or metal ions include nickel-EDTA, nickel-acetate, nickel-formate, molybdenum-citrate, nickel-NTA, and molybdenum-NTA. For a review see A. Jos van Dillen, R. J. A. M. Terörde, D. J. Lensveld, J. W. Geus, and K. P. de Jong, "Synthesis of supported catalysts by impregnantion and drying using aqueous chelated metal complexes," Journal of Catalysis, 2003, p. 257-264, herein incorporated by reference in its entirety.

The Group VIB and/or Group VIII metals can be added to the magnesium aluminosilicate clay prior to or after calcination of the magnesium aluminosilicate clay. For example, the magnesium aluminosilicate clay can be (1) dried, impregnated with active metal(s), extruded, and calcined, or (2) impregnated with active metal(s), extruded, and calcined, (3) dried, extruded, dried or calcined, impregnated with active metal(s), and calcined, or (4) dried, extruded, calcined, and impregnated with active metals. The magnesium aluminosilicate clay can be mixed with one or more components such as zeolites, crystalline cracking components, non-crystalline cracking components, catalytically inactive binders, diluents, and combinations thereof prior to or after impregnation with the Group VIB and/or Group VIII metals.

The order of addition of hydrocracking catalyst components to the final hydrocracking catalyst can vary. Catalysts comprising the magnesium aluminosilicate clay can be prepared in any way known in the art. For instance, the magnesium aluminosilicate clay can be extruded into particles, the particles calcined, and then the calcined particles impregnated with an impregnating solution containing salts of the hydrogenation metals to be introduced, optionally in combination with other components such as phosphoric acid, and/or complexing agents. Alternatively, the magnesium aluminosilicate can be mixed with other support materials such as amorphous alumina, silica alumina, and the like which may have their own catalytic activity, whereupon this mixture can be extruded and the resulting extrudates calcined. The calcined extrudates can then be impregnated as described above. It is also possible to add certain hydrogenation metal components to the catalyst composition prior to extrusion, more particularly, it is proposed to mix the magnesium aluminosilicate employed in the process of the invention and any other support materials with molybdenum oxide, after which the resulting mixture is extruded and calcined.

If the catalyst contains non-noble Group VIII metals and/or Group VIB metals as hydrogenation metals, it is preferably sulfided prior to use. This involves converting the metal components in the catalyst to their sulfided form. The sulfiding can be done by means of processes known to the skilled person, for example, by contacting the catalyst in the reactor at rising temperature with hydrogen and a sulfurous feed, or with a mixture of hydrogen and hydrogen sulfide. Ex situ presulfiding is also possible. Sulfurizing conditions include a temperature range of 200°-400° C. preferably 250°-300° C. and a pressure variable between atmospheric and high. The sulfurizing agent can be elemental sulfur, mercaptans, thiophene, or mixtures of hydrogen and hydrogen sulfide.

After sulfurization, the catalyst is ready to be used in either a conventional fixed bed reactor or an ebullating bed reactor.

If the catalyst contains a Group VIII noble metal, there is no need for sulfiding as a rule, and a reducing step, for example, with hydrogen, will suffice.

Generally, the magnesium aluminosilicate clay employed in the invention can comprise from about 1% to about 99.9% of the hydrocracking catalyst. For example, catalysts are envisaged containing 1-99.9 wt. % of the magnesium aluminosilicate clay, 0-25 wt. % of a zeolite component, 0.1-35 wt. % of a hydrogenation metal component, 0-97.9 wt. % of mesoporous alumina, and the balance inorganic oxide matrix material. Suitable inorganic oxide matrix materials are, for example, alumina, silica, titania, zirconia, and combinations thereof. In one embodiment the inorganic oxide matrix material is alumina In one embodiment, the hydrocracking catalyst of the present invention comprises 0.1 wt. % platinum, palladium, or combinations thereof and 99.9% magnesium aluminosilicate clay of the present invention. In another embodiment, the hydrocracking catalyst comprises (1) 20 to 30 wt. % Group VIB metal, non-noble Group VIII metal, or combinations thereof, (2) 0.5 to 60 wt. % large pore zeolite such as zeolite Y, and (3) 10 to 79.5 wt % magnesium aluminosilicate clay, wherein the magnesium aluminosilicate clay is synthesized according to the process steps outlined above.

In an embodiment, the catalyst comprises 5-20 wt. %, preferably 8-16 wt. %, of a Group VIB metal, calculated as the oxide. Generally, if less than 5 wt. % is used, the activity of the catalyst is insufficient. On the other hand, if more than 20 wt. %, is used, the catalytic performance is not improved further.

In another embodiment, the catalyst comprises 0.5-6 wt. %, preferably 1-5 wt. %, of Group VIII metal, calculated as oxide. If the amount is less than 0.5 wt. %, the activity of the catalyst will be too low. If more than 6 wt. % is present, the catalyst performance will not be improved further.

Optionally, a promoter such as a phosphorus, boron, silicon, or combinations thereof can be added as in known in the art. For example, it will be obvious to the skilled person that phosphorus can be incorporated into the catalyst in a suitable manner by contacting the catalyst during any one of its formative stages with an appropriate quantity of a phosphorus-containing compound, e.g., phosphoric acid. For instance, the catalyst can be impregnated with an impregnating solution comprising phosphorus in addition to any other components. If the catalyst according to the invention contains phosphorus, this compound is preferably present in an amount of 0.5-10 wt. %, calculated as $P_2O_5$, based on the weight of the catalyst composition.

The catalysts described above can be in the form of particles of many different shapes. The suitable shapes include spheres, cylinders, rings, and symmetric or asymmetric polylobes, for instance tri- and quadrulobes. The particles usually have a diameter in the range of 0.5 to 10 mm, and their length likewise is in the range of 0.5 to 10 mm.

The process of the invention can employ a wide variety of hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, synthetic paraffins from NAO, recycled plastic feedstocks, biologically derived feestocks such as plant oils, plant waxes, animal fats, animal oils, and combinations thereof. Other feeds include synthetic feeds, such as those derived from a Fischer Tropsch process, including an oxygenate-containing Fischer Tropsch process boiling below about 371° C. (700° F.). Examples of feedstocks include, but are not limited to, petroleum distillates, solvent-deasphalted petroleum residua, shale oils coal tar distillates, and hydrocarbon feedstocks derived from plant, animal, and/or algal sources. The feedstocks can boil above 200° F. The feedstocks can contain substantial amounts of materials boiling in the range 350 to 950° F., and even substantial amounts of materials boiling in the range 400 to 900° F. Other suitable feedstocks include those heavy distillates normally defined as heavy straight-run gas oils and heavy cracked cycle oils, as well as conventional FCC feed and portions thereof. In general, the feed can be any carbon containing feedstock susceptible to hydroprocessing catalytic reactions. Depending on the type of processing the hydrocarbonaceous feed is to undergo, the feed can contain metal or be free of metals, it can also have high or low nitrogen or sulfur impurities.

The hydrocarbonaceous feedstocks which can be effectively treated by the catalyst include those which contain vanadium, nickel, arsenic, iron, or combinations thereof. The vanadium, nickel, arsenic, and/or iron contents of the feedstocks can exceed 1000 ppm. The feedstocks can comprise asphaltenes in amounts greater than 5 wt. %. The feedstocks can comprise asphaltenes in amounts greater than 8 wt. %. In some embodiments, the feedstocks can comprise asphaltenes in amounts greater than 25 wt. %. In embodiments, the feedstock comprises a vanadium content of greater than 50 ppm vanadium. In another embodiment the feedstock comprises a vanadium content of greater than 100 ppm vanadium. The sulfur conent of the feedstocks to be processed can vary. Sulfur contents of 1%, 2% or greater are possible. Sulfur content of the feedstocks can be lower than 1%. Nitrogen content of the feedstocks can range from 0 ppm to greater than 1000 ppm.

Cracked stocks can be obtained from thermal or catalytic cracking of various stocks, including those obtained from petroleum, gilsonite, shale and coal tar. The feedstocks can be subjected to a hydrofining treatment, a hydrogenation treatment, a hydrocracking treatment, or combinations thereof, prior to contact with the catalyst of the invention. Organic nitrogen content of the feedstock is generally less than 1000 parts per million (ppm), preferably 0.5 to 500 parts per million, and more preferably, 0.5 to 100 parts per million. When contacting the catalyst of this invention, it is preferable to maintain the organic sulfur content of the feedstock in a range of from about 0 to 3 weight percent, preferably from 0 to 1 weight percent.

The hydrocracking of hydrocarbonaceous feeds can take place in any convenient mode, for example, in fluidized bed, moving bed, or fixed bed reactors depending on the types of process desired. The formulation of the catalyst particles will vary depending on the process and method of operation.

In an embodiment, the present invention is directed to a hydrocracking process comprising contacting a hydrocarbon feedstock under hydrocracking conditions with a catalyst comprising a magnesium aluminosilicate clay wherein said magnesium aluminosilicate clay is synthesized by a process comprising the following steps:
  a) combining (1) a silicon component, (2) an aluminum component, and (3) a magnesium component, under aqueous conditions at a first reaction temperature and at ambient pressure, to form a first reaction mixture, wherein the pH of said first reaction mixture is acidic;
  b) adding an alkali base to the first reaction mixture to form a second reaction mixture having a pH greater than the pH of the first reaction mixture; and
  c) reacting the second reaction mixture at a second reaction temperature and for a time sufficient to form a product comprising a magnesium aluminosilicate clay.

In an embodiment, the invention is directed to hydrocracking processes comprising the step of contacting a hydrocarbonaceous feedstock with a catalyst composition comprising a magnesium aluminosilicate clay wherein the magnesium aluminosilicate clay has a silicon to aluminum elemental mole ratio greater than 3 and wherein the $^{29}$Si NMR of the magnesium aluminosilicate clay comprises peaks as given in Table 1.

In another aspect, the invention is directed to a hydrocracking catalyst comprising a magnesium aluminosilicate clay wherein the magnesium aluminosilicate clay has a silicon to aluminum elemental mole ratio greater than 3 and wherein the $^{29}$Si NMR of the magnesium aluminosilicate clay comprises peaks as given in Table 1.

Any suitable reaction time (contact time) between the hydrocracking catalyst, hydrogen and the hydrocarbonaceous feedstock can be utilized. In general, the contact time will range from about 0.1 hours to about 10 hours. Preferably, the reaction time will range from about 0.4 to about 4 hours. Thus the flow rate of the hydrocarbon-containing feed stream in a continuous operation should be such that the time required for the passage of the mixture through the reactor (residence time) will be in the range of from about 0.1 to about 10 hours, and preferably be in the range of from about 0.4 to about 4 hours. This generally requires a liquid hourly space velocity (LHSV) in the range of about 0.10 to about 10 cc of oil feed per cc of catalyst per hour, preferably from about 0.2 to about 2.5 cc/cc/hr.

According to one embodiment, the hydrocarbon feed is placed in contact with the hydrocracking catalyst in the presence of hydrogen, usually in a fixed bed reactor. The conditions of the hydrocracking process may vary according to the nature of the feed, the intended quality of the products, and the particular facilities of each refinery. The temperature is usually greater than 200° C., and is often comprised between 250° C. and 480° C. Pressure is usually greater than 0.5 bar and often greater than 10 bar. The $H_2$/hydrocarbon ratio is usually greater than 100 and usually between 150 and 15,000 scfb. Liquid hourly space velocity (LHSV) is generally between 0.01 and 20 feed volumes per catalyst volume per hour. The hydrocracking process according to this particular embodiment is preferably performed at temperatures from 250° C. to 320° C.

Other hydroprocessing catalysts and reactions are also envisaged employing the magnesium aluminosilicate described above. Hydrocracking in combination with hydrodemetallization is a hydroprocessing reaction envisaged for catalysts comprising the magnesium aluminosilicate described herein. Table 2 gives general process conditions for catalysts comprising the magnesium aluminosilicate described above.

TABLE 2

| Process | Temp., ° C. | Pressure | LHSV |
| --- | --- | --- | --- |
| Hydrocracking | 175-485 | 0.5-350 bar | 0.1-30 |
| Dewaxing | 200-475 (250-450) | 15-3000 psig, (200-3000 psig) | 0.1-20 (0.2-10) |
| Aromatics formation | 400-600 (480-550) | atm.-10 bar | 0.1-15 |
| Cat. Cracking | 127-885 | subatm.-[1] (atm.-5 atm.) | 0.5-50 |
| Oligomerization | 232-649[2] 10-232[4] (27-204)[4] | 0.1-50 atm.[2, 3] — — | 0.2-50[2] 0.05-20[5] (0.1-10)[5] |
| Isomerization | 93-538 (204-315) | 50-1000 psig, | 1-10 (1-4) |

[1]Several hundred atmospheres
[2]Gas phase reaction
[3]Hydrocarbon partial pressure
[4]Liquid phase reaction
[5]WHSV Catalyst compositions comprising the magnesium aluminosilicate clay described above, wherein the magnesium aluminosilicate clay is predominantly in the protonated form, can be used to dewax hydrocarbonaceous feeds by cracking and/or isomerizing straight chain paraffins. Typically, the viscosity index of the dewaxed product is improved (compared to the waxy feed) when the waxy feed is contacted with said catalyst compositions under isomerization dewaxing conditions.

The catalytic dewaxing conditions are dependent in large measure on the feed used and upon the desired pour point. Hydrogen is typically present in the reaction zone during the catalytic dewaxing process. The hydrogen to feed ratio is typically between about 500 and about 30,000 SCF/bbl (standard cubic feet per barrel) (0.089 to 5.34 SCM/liter) (standard cubic meters/liter), for example about 1000 to about 20,000 SCF/bbl (0.178 to 3.56 SCM/liter). Generally, hydrogen will be separated from the product and recycled to the reaction zone. Typical feedstocks include light gas oil, heavy gas oils and reduced crudes boiling above about 350° F. (177° C.).

A typical dewaxing process is the catalytic dewaxing of a hydrocarbon oil feedstock boiling above about 350° F. (177° C.) and containing straight chain and slightly branched chain hydrocarbons by contacting the hydrocarbon oil feedstock in the presence of added hydrogen gas at a hydrogen pressure of about 15-3000 psi (0.103-20.7 Mpa) with a catalyst comprising the magnesium aluminosilicate described above and at least one Group VIII and/or Group VIB metal. Optionally, a promoter such as a phosphorus, boron, silicon, or combinations thereof can be added as in known in the art. The catalyst may be run in such a mode to increase isomerization dewaxing at the expense of cracking reactions.

Catalyst compositions comprising the magnesium aluminosilicate clays employed in the invention, wherein the magnesium aluminosilicate clays are predominantly in the protonated form, can be used to make lube oil. For example, a $C_{20+}$ lube oil may be made by isomerizing a $C_{20+}$ olefin feed over a catalyst comprising the magnesium aluminosilicate. Preferably, the magnesium aluminosilicate is in the protonated form. Preferably the catalyst further comprises at least one Group VIII metal. Alternatively, the lubricating oil may be made by hydrocracking in a hydrocracking zone a hydrocarbonaceous feedstock to obtain an effluent comprising a hydrocracked oil, and catalytically dewaxing the effluent at a temperature of at least about 400° F. (204° C.) and at a pressure of from about 15 psig to about 3000 psig (0.103-20.7 Mpa gauge) in the presence of added hydrogen gas with a catalyst comprising the magnesium aluminosilicate employed in the process of the invention.

The magnesium aluminosilicate clay of the invention can be used in catalysts for catalytic cracking. Preferably the magnesium aluminosilicate is in the protonated form. Hydrocarbonaceous feedstocks can be catalytically cracked in the absence of hydrogen using a catalytic cracking catalyst.

Catalytic cracking catalysts can further comprise any aluminosilicate heretofore employed as a component in cracking catalysts. Typically, these are large pore, crystalline aluminosilicates. Examples of these traditional cracking catalysts are disclosed in U.S. Pat. No. 4,910,006 and U.S. Pat. No. 5,316,753. When a traditional cracking catalyst (TC) component is employed, the relative weight ratio of the TC to the magnesium aluminosilicate employed in the process of the invention is generally between about 1:10 and about 500:1, desirably between about 1:10 and about 200:1, for example between about 1:2 and about 50:1 or between about 1:1 and about 20:1.

The cracking catalysts are typically employed with an inorganic oxide matrix component. See the aforementioned U.S. Pat. No. 4,910,006 and U.S. Pat. No. 5,316,753 for examples of such matrix components.

During hydrotreatment, oxygen, sulfur and nitrogen present in the hydrocarbonaceous feed is reduced to low levels. Aromatics and olefins, if present in the feed, may also have their double bonds saturated. In some cases, the hydrotreating catalyst and hydrotreating conditions are selected to minimize cracking reactions, which can reduce the yield of the most desulfided product (typically useful as a fuel).

Hydrotreating conditions typically include a reaction temperature between 400-900° F. (204-482° C.), for example 650-850° F. (343-454° C.); a pressure between 500 and 5000 psig (3.5-34.6 Mpa), for example 1000 to 3000 psig (7.0-20.8 MPa); a feed rate (LHSV) of 0.5 $hr^{-1}$ to 20 $hr^{-1}$ (v/v); and overall hydrogen consumption 300 to 2000 scf per barrel of liquid hydrocarbon feed (53.4-356 $m^3 H_2/m^3$ feed). Hydrotreating catalysts can comprise the magnesium aluminosilicate described above.

While not being bound by any theory, we believe that catalyst compositions comprising the magnesium aluminosilicate clay of the invention as described above are particularly suited for hydroprocessing reactions such as the hydrocracking of high molecular weight hydrocarbons because of the large surface area, pore structure, and high density of acid sites of the magnesium aluminosilicate clays employed in the process of the present invention. Relatively large size organic molecules, such as high molecular weight hydrocarbons (hydrocarbons having greater than 20 carbon atoms) and aromatic compounds, can penetrate the mesopores of the magnesium aluminosilicate clays employed in the process of the present invention or react with acid sites on the surface of the magnesium aluminosilicate clays. The magnesium aluminosilicate clay employed in the process of the invention, with its extensive surface area, helps disperse active Group VIB and/or Group VIII metals, providing more discreet sites for hydrogenation reactions to occur. Furthermore, the magnesium aluminosilicate clay comprising the catalysts of the invention and employed in the process of the invention exhibit higher activity than magnesium aluminosilicate clays synthesized by other methods, likely due to increased incorporation of $Al^{3+}$ into the tetrahedral sheets, leading to higher acid site density and a more active catalyst composition.

EXAMPLES

Example 1 (Comparative)

A magnesium aluminosilicate with an elemental composition $Mg5.7[Si6.4Al1.6]O20(OH)4$ with a Si/Al=4 was prepared as follows. Water glass (sodium silicate) (27 wt. % $SiO_2$) was mixed with aluminum nitrate at room temperature to form a silica-alumina gel. The mixture was then filtered and added to a solution of magnesium nitrate and the pH adjusted with NaOH to about 8.8. The reaction was allowed to proceed for 40 hours at 90° C. after which time the reaction mixture was filtered and washed. The filtrate was a magnesium aluminosilicate clay.

Example 2

A magnesium aluminosilicate clay with an elemental composition $Mg5.4[Si6.6Al1.4]O20(OH)4$ with a Si/Al=4.7 was prepared as follows. Water glass (27 wt. % $SiO_2$) was mixed with aluminum nitrate at room temperature and the pH adjusted to about 1 with nitric acid. A solution of magnesium nitrate was added to form a first reaction mixture. The pH of the first reaction mixture was acidic. The pH of the first reaction mixture was then adjusted to about 8.4 with the addition of NaOH to form a second reaction mixture. The reaction was allowed to proceed for 1 hour at 50° C. after which time the second reaction mixture was filtered and washed. The filtrate was the magnesium aluminosilicate clay of the invention.

Example 3 (Comparative)

The magnesium aluminosilicate clay of Example 1 was added to a 0.1 M solution of ammonium nitrate to exchange the sodium cations for ammonium cations. The ammonium substituted magnesium aluminosilicate clay was collected by filtration and washed with water. The ammonium substituted magnesium aluminosilicate clay was then calcined at 450° C. degrees for 12 hours to convert the magnesium aluminosilicate clay to the protonated form.

Example 4

The magnesium aluminosilicate clay of Example 2 was added to a 0.1 M solution of ammonium nitrate to exchange the sodium cations for ammonium cations. The ammonium substituted magnesium aluminosilicate clay was collected by filtration and washed with water. The ammonium substituted magnesium aluminosilicate clay was then calcined at 450° C. degrees for 12 hours to convert the magnesium aluminosilicate clay to the protonated form.

Example 5. (Comparative)

Amorphous silica-alumina (71.3 wt. %) was mixed with faujasite (5.7 wt. %), and mesoporous alumina (23 wt. %) under aqueous conditions in the presence of dilute nitric acid to form an extrudable mixture. The material was extruded, dried at 250° F. for one hour, and then calcined at 1100° F. for one hour. The calcined extrudate was then mixed with a solution of nickel and tungsten salts. The mixture was allowed to soak for 2 hr., then dried at 270° F. for 0.5 hours. After drying, the material was calcined at 950° F. for 1 hour. The metal content of the final catalyst was approximately 5 wt. % NiO and 25 wt. % $WO_3$.

Example 6 (Comparative)

The magnesium aluminosilicate clay of Comparative Example 3 (44.8 wt. %) was mixed with faujasite (5.5 wt. %), boehmite (16.2 wt. %), and mesoporous alumina (33.4 wt. %) under aqueous conditions in the presence of dilute nitric acid to form a slurry. Water soluble methylcellulose derived polymer (Methocel Dow Corp.) was added to achieve an extrudable mixture (less than 1 wt. % methocel added). The mixture was extruded, dried at 250° F., and calcined at 1100° F. for one hour to form a calcined extrudate. The calcined extrudate was then mixed with a solution of nickel and tungsten salts in the presence of citrate. The mixture was allowed to soak for 1 hr., then dried at 212° F. for 2 hours. The metal content of the final catalyst was 5 wt. % NiO and 25 wt. % $WO_3$.

Example 7

The magnesium aluminosilicate of the invention, Example 4, (44.8 wt. %) was mixed with faujasite (5.5 wt. %), boehmite (16.2 wt. %), and mesoporous alumina (33.4 wt. %) under aqueous conditions in the presence of dilute nitric acid to form a slurry. Water soluble methylcellulose derived polymer (Methocel Dow Corp.) was added to achieve an extrudable mixture (less than 1 wt. % methocel added). The mixture was extruded, dried at 250° F., and calcined at 1100° F. for one hour to form a calcined extrudate. The calcined extrudate was then mixed with a solution of nickel and tungsten salts in the presence of citrate. The mixture was allowed to soak for 1 hr., then dried at 212° F. for 2 hours. The metal content of the final catalyst was approximately 5 wt. % NiO and 25 wt. % $WO_3$.

Example 8

The catalysts of Example 6 (Comparative), Example 7 (Comparative), and Example 8 (invention) were sulfided and compared for hydrocracking activity on a feedstock with the characteristics given in Table 3.

TABLE 3

|  | Feedstock |
|---|---|
| Nitrogen (ppm) | 1152 |
| Sulfur (wt. %) | 2.70 |
| wax (wt. %) | 11.1 |
| VI | 72 |
| vis 100° C. | 9.645 |

TABLE 3-continued

| | Feedstock |
|---|---|
| API | 19.8 |
| IBP[1] | 638 |
| 5% | 694 |
| 10% | 734 |
| 20% | 770 |
| 30% | 805 |
| 40% | 836 |
| 50% | 866 |
| 60% | 894 |
| 70% | 923 |
| 80% | 956 |
| 90% | 991 |
| 95% | 1013 |
| end | 1055 |

[1]Initial Boiling Point

Hydrocracking results are given in Table 4 for a 60% conversion of the feedstock. Reaction conditions included a pressure of 2300 psig, a molar ratio of hydrogen to hydrocarbon of 5000 scfb and a feed rate of 0.75 hr$^{-1}$ LHSV.

TABLE 4

| | Example 5 (Comparative) | Example 6 (Comparative) | Example 7 (invention) |
|---|---|---|---|
| T req 60% (° F.) | 743 | 745 | 745 |
| C4- | 2.0 | 2.1 | 2.1 |
| C5-180° F. | 3.5 | 3.1 | 2.5 |
| 180-250° F. | 5.3 | 5.1 | 4.7 |
| 250-550° F. | 34.1 | 34.0 | 34.0 |
| 550-700° F. | 16.6 | 17.4 | 18.5 |
| 700-800° F. | 14.9 | 15.3 | 15.2 |
| 800-900° F. | 13.5 | 12.7 | 12.8 |
| 900° F.+ | 9.5 | 9.6 | 9.6 |
| W viscosity 100° C. (cSt) | 5.244 | 5.040 | 4.940 |
| Waxy VI 700° F.+ | 144 | 146 | 150 |
| DWO (dewaxed oil) viscosity 100° C. (cSt) | 5.112 | 5.067 | 4.922 |
| DWO (dewaxed oil) VI (Viscosity Index) 700° F.+ | 132 | 132 | 132 |

Table 4 demonstrates that the catalyst comprising the magnesium aluminosilicate of the invention has improved yield of middle distillate in fuels hydrocracking than a catalyst comprising a magnesium aluminosilicate synthesized by prior art methods or a conventional catalyst of amorphous silica alumina, zeolite, and alumina binder. The temperature required for 60% conversion is similar for all three catalysts. However, the yield in the middle distillate range (550-700° F.) is highest for the hydrocracking catalyst of the invention.

The invention claimed is:

1. A hydrocracking catalyst comprising a magnesium aluminosilicate clay wherein said magnesium aluminosilicate clay is synthesized according to a method comprising the following steps:
a) combining (1) a silicon component, (2) an aluminum component, and (3) a magnesium component, under aqueous conditions at a first reaction temperature and at ambient pressure, to form a first reaction mixture, wherein the pH of said first reaction mixture is acidic;
b) adding an alkali base to the first reaction mixture to form a second reaction mixture wherein the pH of the second reaction mixture is greater than the pH of the first reaction mixture;
c) reacting the second reaction mixture at a second reaction temperature and for a time sufficient to form a product comprising a magnesium aluminosilicate;
wherein the magnesium aluminosilicate clay comprises from about 1 wt. % to about 95 wt. % of the hydrocracking catalyst and
wherein the magnesium aluminosilicate clay is in the protonated form.

2. The hydrocracking catalyst of claim 1, wherein the magnesium aluminosilicate clay comprises from about 5 wt. % to about 50 wt. % of the hydrocracking catalyst.

3. The hydrocracking catalyst of claim 1, wherein the magnesium aluminosilicate clay is calcined.

4. The hydrocracking catalyst of claim 1, further comprising an inorganic oxide.

5. The hydrocracking catalyst of claim 4, wherein the inorganic oxide is selected from the group consisting of silica, alumina, magnesia, titania, zirconia, and combinations thereof.

6. The hydrocracking catalyst of claim 1, further comprising a Group VIB metal, a Group VIII metal, or combinations thereof.

7. The hydrocracking catalyst of claim 6, wherein the hydrocracking catalyst is sulfided.

8. The hydrocracking catalyst of claim 6, wherein the Group VIB metal is chromium, molybdenum, tungsten, or combinations thereof.

9. The hydrocracking catalyst of claim 6, wherein the Group VIII metal is nickel, cobalt, iron, ruthenium, rhodium, iridium, platinum, palladium, or combinations thereof.

10. The hydrocracking catalyst of claim 1, further comprising a promoter selected from the group consisting of boron, silicon, phosphorus, tin, germanium, lead, and combinations thereof.

11. A hydrocracking catalyst comprising a magnesium aluminosilicate clay wherein the magnesium aluminosilicate clay has a silicon to aluminum elemental mole ratio greater than 3 and wherein the $^{29}$Si NMR of the magnesium aluminosilicate clay comprises the following peaks

| Peaks | Chemical shift (ppm)[1] |
|---|---|
| P1 | −79 |
| P2 | −82 |
| P3 | −85 |
| P4 | −88 |
| P5 | −93. |

[1]+/−3 ppm

* * * * *